United States Patent
Zupancic et al.

(10) Patent No.: US 10,975,192 B2
(45) Date of Patent: Apr. 13, 2021

(54) CURABLE FORMULATIONS FOR LAMINATING ADHESIVES

(71) Applicant: Rohm and Haas Company, Collegeville, PA (US)

(72) Inventors: Joseph J. Zupancic, Glen Ellyn, IL (US); David E. Vietti, Cary, IL (US); Amira A. Marine, Missouri City, TX (US)

(73) Assignee: Rohm And Haas Company, Collegeville, PA (US)

( * ) Notice: Subject to any disclaimer, the term of this patent is extended or adjusted under 35 U.S.C. 154(b) by 28 days.

(21) Appl. No.: 15/538,847

(22) PCT Filed: Nov. 19, 2015

(86) PCT No.: PCT/US2015/061622
§ 371 (c)(1),
(2) Date: Jun. 22, 2017

(87) PCT Pub. No.: WO2016/105722
PCT Pub. Date: Jun. 30, 2016

(65) Prior Publication Data
US 2017/0369634 A1    Dec. 28, 2017

Related U.S. Application Data

(60) Provisional application No. 62/096,272, filed on Dec. 23, 2014.

(51) Int. Cl.
| | | |
|---|---|---|
| C08G 59/42 | (2006.01) |
| C08G 63/42 | (2006.01) |
| C08G 63/672 | (2006.01) |
| C08G 63/676 | (2006.01) |
| C08G 63/91 | (2006.01) |
| C08L 67/02 | (2006.01) |
| C08L 75/04 | (2006.01) |
| C08L 67/06 | (2006.01) |
| C08L 77/08 | (2006.01) |
| C08K 5/103 | (2006.01) |
| C09J 167/00 | (2006.01) |
| C08L 63/00 | (2006.01) |
| C08L 71/02 | (2006.01) |
| C09J 163/00 | (2006.01) |
| C08L 67/07 | (2006.01) |

(52) U.S. Cl.
CPC ......... *C08G 59/4276* (2013.01); *C08G 63/42* (2013.01); *C08G 63/672* (2013.01); *C08G 63/676* (2013.01); *C08G 63/916* (2013.01); *C08K 5/103* (2013.01); *C08L 63/00* (2013.01); *C08L 67/025* (2013.01); *C08L 67/06* (2013.01); *C08L 67/07* (2013.01); *C08L 71/02* (2013.01); *C08L 75/04* (2013.01); *C08L 77/08* (2013.01); *C09J 163/00* (2013.01); *C09J 167/00* (2013.01)

(58) Field of Classification Search
CPC .. C08G 59/4276; C08G 63/42; C08G 63/672; C08G 63/676; C08G 63/916; C08L 67/025; C08L 67/07
USPC ........................................................ 523/438
See application file for complete search history.

(56) References Cited

U.S. PATENT DOCUMENTS

| | | |
|---|---|---|
| 3,272,647 A | 9/1966 | Swanson et al. |
| 3,836,485 A | 9/1974 | Shih |
| 3,985,825 A * | 10/1976 | Schmid .................. C08L 63/00 525/438 |
| 4,051,195 A * | 9/1977 | McWhorter ......... C09D 163/00 528/106 |
| 4,547,562 A | 10/1985 | Nichols |
| 4,675,374 A | 6/1987 | Nichols |
| 5,087,647 A | 2/1992 | Flakus |
| 5,969,046 A | 10/1999 | Schindler et al. |
| 6,127,508 A | 10/2000 | Corley et al. |
| 6,489,405 B1 | 12/2002 | Beisele |
| 2002/0006484 A1 | 1/2002 | Ramalingam |
| 2003/0047279 A1 | 3/2003 | Ramalingam |
| 2004/0076830 A1 | 4/2004 | Riley et al. |
| 2005/0137357 A1 | 6/2005 | Skoglund et al. |
| 2007/0088145 A1 | 4/2007 | Mgaya et al. |
| 2008/0081883 A1 | 4/2008 | King et al. |

OTHER PUBLICATIONS

PCT/US2015/061622, International Search Report dated Jun. 30, 2016.
PCT/US2015/061622, International Preliminary Report on Patentability dated Jun. 27, 2017.
PCT/US2015/061622, Written Opinion of the International Searching Authority dated Jun. 30, 2016.

\* cited by examiner

*Primary Examiner* — David T Karst

(57) ABSTRACT

The instant invention provides a curable formulation suitable for laminating adhesive applications, and laminating adhesives made therefrom. The curable formulation suitable for laminating adhesive applications according to the present invention comprises a) a blend comprising i) an epoxy terminated polyester and at least one of ii) a maleate (poly) ester or iii) a diacrylate terminated oligomer or polymer and b) an aliphatic amine curing agent.

14 Claims, No Drawings

CURABLE FORMULATIONS FOR LAMINATING ADHESIVES

REFERENCE TO RELATED APPLICATIONS

The present application claims the benefit of U.S. Provisional Application No. 62/096,272, filed Dec. 23, 2014, which is incorporated herein by reference in its entirety.

FIELD OF INVENTION

The instant invention relates to a curable formulation suitable for laminating adhesive applications, and laminating adhesives made therefrom.

BACKGROUND OF THE INVENTION

Isocyanates and bisphenol-A-based epoxy resins are used in laminating adhesives for food packaging applications. However, bisphenol-A epoxy resins are a potential food contaminant and are being phased out in the industry. Isocyanate-based materials can pose safety, sensitization and exposure issues. Monomers and oligomers having an atomic mass of less than 1000 Daltons, if not completely reacted into the polymer network, can migrate into food. In addition, the use of isocyanate-based resins can generate primary aromatic amines which can also potentially migrate into food. Therefore, laminating adhesives with or without solvent which are free of both bisphenol-A- and isocyanate-based materials are desirable.

SUMMARY OF THE INVENTION

The instant invention provides a curable formulation suitable for laminating adhesive applications, and laminating adhesives made therefrom.

In one embodiment, the instant invention provides a curable formulation comprising a) a blend comprising i) an epoxy terminated polyester having the structure

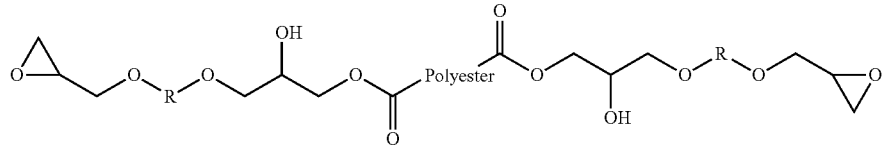

wherein R— is selected from the group consisting of

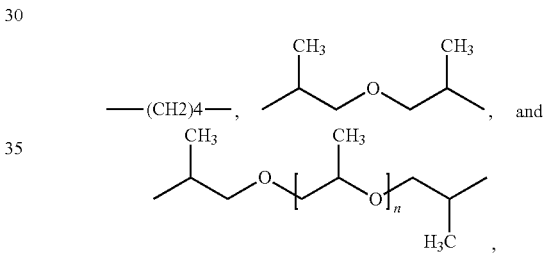

wherein n is 1-25
and wherein the polyester unit is selected from the group consisting of a carboxylic acid-terminated polyester and a dicarboxylic acid-terminated polyester; and at least one of ii) a maleate (poly) ester having a structure selected from the group consisting of

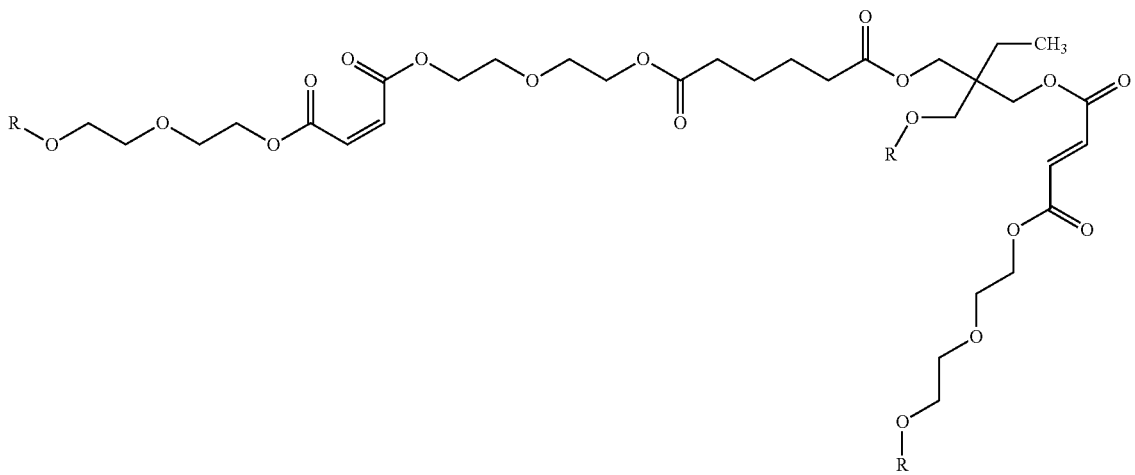

wherein R is independently hydrogen or

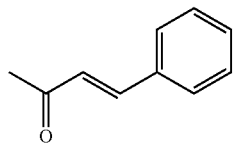

and

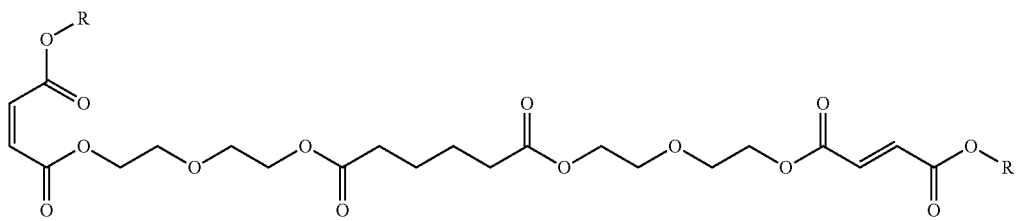

wherein R is independently CH₃, C₂H₅, or

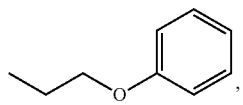

or iii) a diacrylate terminated oligomer or polymer of the general structure

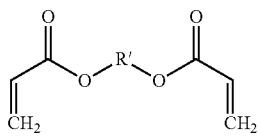

wherein R' is a diol, polyethylene glycol, polypropylene glycol, polyester, or polyurethane radical, and b) an aliphatic amine curing agent.

In another alternative embodiment, the instant invention further provides a laminating adhesive comprising the inventive curable formulation.

In an alternative embodiment, the instant invention provides a laminating adhesive in accordance with any of the preceding embodiments, except that the laminating adhesive is characterized by having an adhesive bond strength in the range of 1.5 to 5.0 N/15 mm depending upon the laminate construction, and application viscosity of ≤6500 mPa*s at 50° C.

DETAILED DESCRIPTION OF THE INVENTION

The instant invention provides a curable formulation suitable for laminating adhesive applications, and laminating adhesives made therefrom. The curable formulation suitable for laminating adhesives comprises, consists of, or consists essentially of a) a blend comprising i) an epoxy terminated polyester having the structure

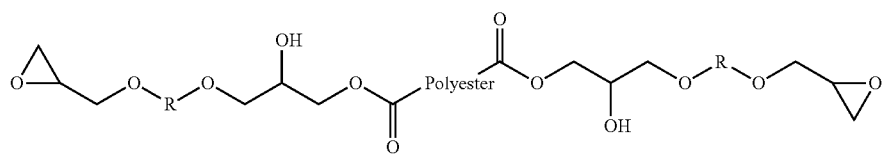

wherein R— is selected from the group consisting of

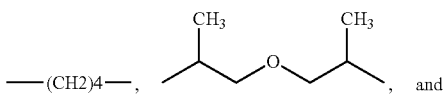

-continued

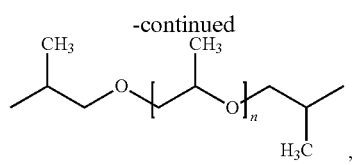

wherein n is 1-25
and wherein the polyester unit is selected from the group consisting of a carboxylic acid-terminated polyester and a dicarboxylic acid-terminated polyester; and at least one of ii) a maleate (poly) ester having a structure selected from the group consisting of or iii) a diacrylate terminated oligomer or polymer of the general structure

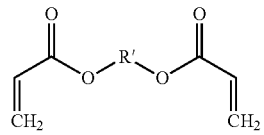

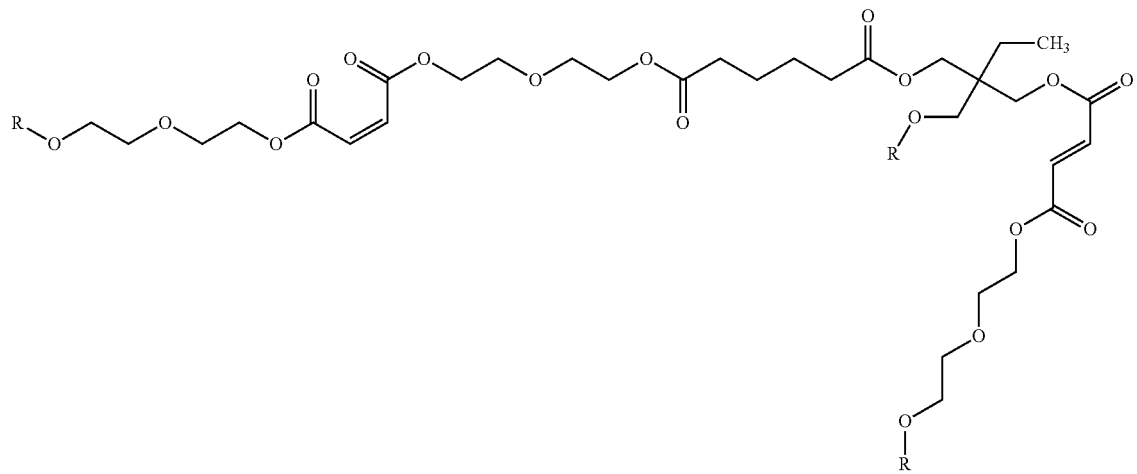

wherein R is independently hydrogen or

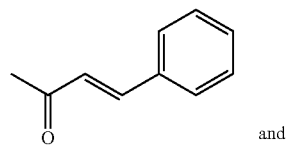

and

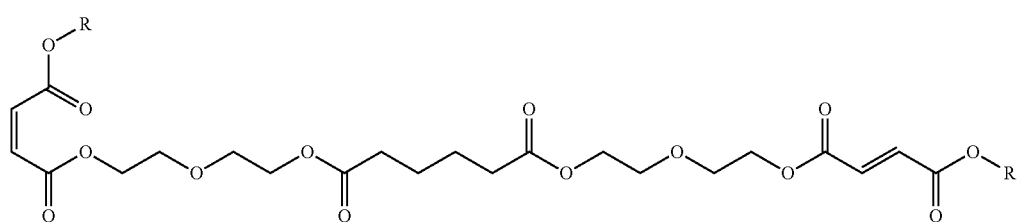

wherein R is independently CH$_3$, C$_2$H$_5$, or

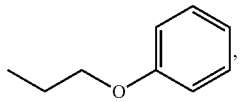

wherein R' is a diol, polyethylene glycol, polypropylene glycol, polyester, or polyurethane radical,
and b) an aliphatic amine curing agent.

In various embodiments, the epoxy-terminated polyester resins of this invention are based on aliphatic glycidyl ether (such as Dipropylene Glycol Diglycidyl Ether, Polypropylene Diglycidyl Ether, or Butanediol Diglycidyl Ether) terminated polyester resins of Structure I, below.

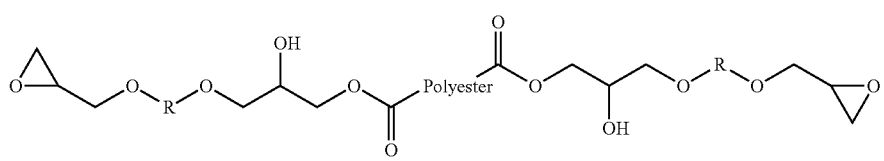

Structure I

In various embodiments, R— is selected from the group consisting of

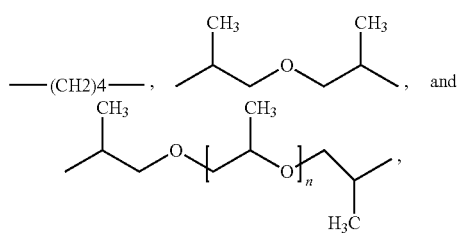

wherein n is 1-25. All individual values and subranges between 1 and 25 are included herein and disclosed herein, for example, n can be from 1-10.

In various embodiments, the polyester unit is based upon a dicarboxylic acid or carboxylic acid terminated polyester oligomer/resin. The dicarboxylic acids which can be used include, but are not limited to adipic acid, azelaic acid, sebacic acid, succinic acid, fumaric acid, maleic acid, 1,4-cyclohexanedicarboxylic acid, ortho-phthalic acid, isophthalic acid, and terephthalic acid. The carboxylic acid terminated polyester can be based upon ethylene glycol, diethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, triethylene glycol, trimethylol ethane, trimethylol propane, glycerine, fumaric acid, maleic acid, adipic acid, succinic acid, azelaic acid, sebacic acid, phthalic anhydride, isophthalic acid, terephthalic acid, 1,4-cyclohexanedicarboxylic acid, maleic anhydride, and succinic anhydride.

Additional information about these resins can be found in PCT Publication No. WO/2015/073956.

The carboxylic acid terminated polyesters can have an Acid Value (AV) in the range of 100 to 250. All individual values and subranges are included herein and disclosed herein, for example the AV can be in the range of 140 to 210.

The epoxy-terminated polyester resins of this invention have an Epoxy Equivalent Weight (EEW) of 242 to 1400. All individual values and subranges are included herein and disclosed herein, for example, the EEW can be in the range of from 450 to 850.

The epoxy-terminated polyester resin is present in the curable formulation in the range of from 50.0 to 82.5 percent by weight. All individual values and subranges between 50.0 and 82.5 percent by weight are included herein and disclosed herein; for example, the epoxy-terminated polyester resin can be present in the curable formulation in the range of from 50.0 to 82.5 percent by weight, from 60.0 to 78.0 percent by weight, and from 70.0 to 78.0 percent by weight.

In various embodiments, the maleate polyester of this invention is based on maleic anhydride which is co-polymerized with a dicarboxylic acid and/or anhydride and a glycol. These embodiments are depicted in Structures IIa and IIb, below.

Structure IIa

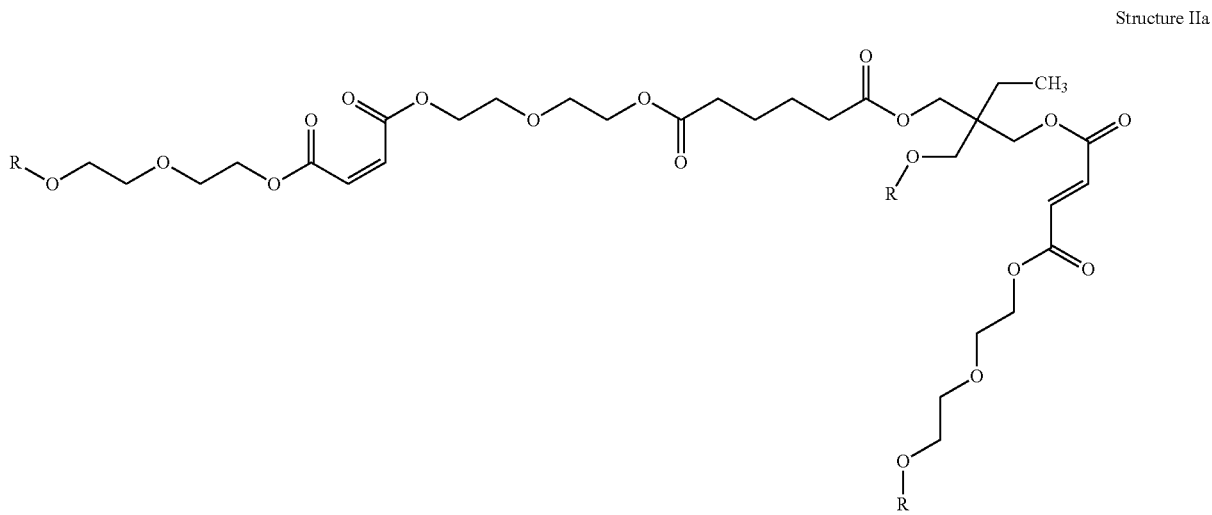

In various embodiments, R is independently hydrogen or

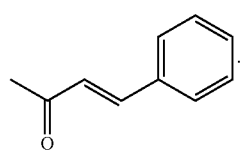

Structure IIb

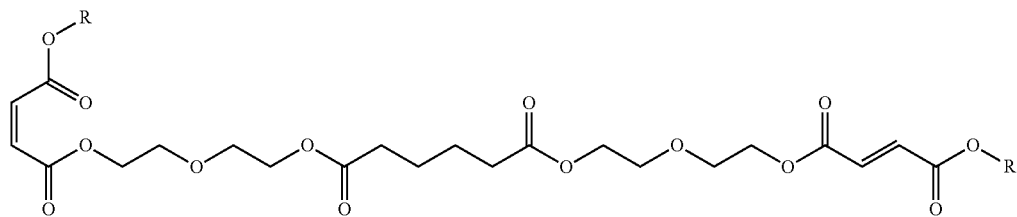

In various embodiments, R is independently CH₃, C₂H₅, or.

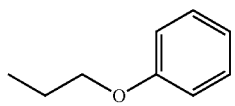

Examples of dicarboxylic acids which can be used include, but are not limited to are adipic acid, azelaic acid, sebacic acid, succinic acid, fumaric acid, maleic acid, 1,4-cyclohexanedicarboxylic acid, and ortho-phthalic acid. The glycol can be ethylene glycol, diethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, triethylene glycol, isosorbide, trimethylol ethane, trimethylol propane, glycerine, etc. The polyester can be hydroxyl terminated or can be capped with an alcohol or carboxylic acid. Cinnamic acid can also be used to terminate the polyester and the cinnamate functionality may provide an additional reactive site for reaction with an amine via Aza-Michael curing. The maleate functionality can isomerize under reaction conditions employed to prepare the polyester to yield a mixture of maleate and fumarate moieties.

The molecular weight of the polyester can range of from 600 to 4000. All individual values and subranges are included herein and disclosed herein, for example, the molecular weight of the polyester resin can be in the range of from 650 to 1500.

In various embodiments, the maleate polyesters have an Active Double Bond Equivalent Weight in the range of 350 to 1500. The term Active Double Bond Equivalent Weight encompasses groups such as α,β-unsaturated (double bonds) activated groups such as maleate, fumarate, cinnamate, etc. All individual values and subranges are included herein and disclosed herein, for example the Active Double Bond Equivalent Weight can be in the range of from 350 to 1000.

In various embodiments, the formulation can include a diacrylate terminated oligomer or polymer of general structure

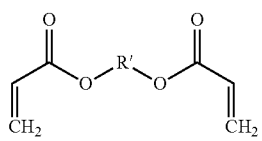

wherein R' is a diol, polyethylene glycol, polypropylene glycol, polyester, or polyurethane radical. The diols can be 1,4-butanediol, 1,6-hexanediol, 2-methyl-1,3-propanediol, neopentyl glycol, diethylene glycol, triethylene glycol, tetraethylene glycol, polyethylene glycol, dipropylene glycol, tripropylene glycol, polypropylene glycol, cyclohexane dimethanol, alkoxylated hexanediol, alkoxylated cyclohexane dimethanol, propoxylated neopentyl glycol, etc. The polyester oligomers can be based upon diols such as ethylene glycol, diethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, triethylene glycol, etc; with the dicarboxylic acids such as adipic acid, azelaic acid, sebacic acid, succinic acid, fumaric acid, maleic acid, 1,4-cyclohexanedicarboxylic acid, ortho-phthalic acid, isophthalic acid, and terephthalic acid. Acrylated aliphatic urethane oligomers can be based upon using acrylate monomers such as 2-hydroxyethyl acrylate, hydroxypropyl acrylate, hydroxybutyl acrylate reacted with aliphatic isocyanate prepolymers based upon hexane diisocyanate, isophorone diisocyanate, xylene diisocyanate, or 4,4'-methylenebis(cyclohexyl isocyanate) with hydroxyl terminated polyesters, polyethylene glycol, or polypropylene glycol. Acrylated aromatic urethane oligomers can be based upon using acrylate monomers such as 2-hydroxyethyl acrylate, hydroxypropyl acrylate, hydroxybutyl acrylate reacted with aliphatic isocyanate prepolymers based upon toluene diisocyanate or 4,4'-methylene diphenyl diisocyanate with hydroxyl terminated polyesters, polyethylene glycol, or polypropylene glycol.

In various embodiments, the diacrylate resins have an Acrylate Equivalent Weight in the range of 63.5 to 2000. All individual values and subranges are included herein and disclosed herein, for example the Acrylate Equivalent Weight can be in the range of from 100 to 800.

In various embodiments, the formulation can also comprise a solvent. Examples of solvents that can be used include, but are not limited to ethyl acetate, methyl ethyl ketone, methyl acetate, acetone, and combinations thereof.

The formulation can also be substantially solvent-free.

The curable formulation is cured with an aliphatic amine curing agent. In various embodiments, the aliphatic amine curing agent has low to moderate levels (0-ca. 25%) of low molecular weight (≤500 amu) amines. In various embodiments, the curing agent will have a molecular weight of ≥750 amu in order to minimize low molecular weight oligomers which might yield low molecular weight residuals capable of imparting odor or migrating species. All individual ranges and subranges of ≥750 amu are included herein and disclosed herein.

In various embodiments, the amine based curing agent has an Amine Value in the range of 50 to 500. All individual values and subranges are included herein and disclosed herein, for example the Amine Value can be in the range of from 150 to 360.

Examples of aliphatic amine agents include, but are not limited to phenalkamines, phenalkamides, amino amide resins of dimer acids, amino imidazolines that are derived from aliphatic diamines such as ethylenediamine, diethylenetriamine, triethylenetetramine, tetraethylenepentamine, piperazine, aminoethylpiperazine, isophorone diamine, xylylenediamine, and mixtures of these amines.

The curable formulation is cured with the aliphatic amine curing agent in a mix ratio in the range of from 100:15.0 to 100:70.0. All individual values and subranges between 100:15.0 and 100:70.0 are included herein and disclosed herein. The mix ratio is determined by the epoxide equivalent weight (EEW) of the epoxide terminated polyester and the activated double bond functionality of component ii and/or iii (maleate or acrylate functionality of the secondary component) and the amine value of the curative. The preferred mix ratio will be in the range of a stoichiometric balanced or 75% of stoichiometric balance of component a to b.

In various embodiments, the curing of the adhesive of this invention occurs by two different reaction pathways: 1) conventional curing of an epoxide with an amine, and 2) Aza-Michael curing of the maleate functionality or acrylate moiety (radical) with an amine. The curing of the maleate polyester resin with the amine curative is believed to occur by addition of the amine to the activated maleate and/or fumarate functionality present in the polyester via an Aza-Michael addition reaction; similarly the acrylate terminated resin/oligomer reacts by addition of the amine to acrylate via an Aza-Michael reaction. This reaction yields a carbon-nitrogen bond and results in the generation of a substituted amine functional group. The substituted amine may be capable of further reaction depending upon steric hindrance and reactivity of other amines in the polymer network.

The curable formulation according to the present invention can be formed into laminating adhesives and can be used in various packaging applications, e.g. food packaging applications. The laminates prepared according to the present invention may be used in various packaging applications, e.g. food packaging applications such as cans or containers with metal lidding or flexible heat seal lidding, pouches, flexible boxes or cartons, or packaging trays. The laminating adhesives according to the present invention also have a bond strength upon curing in the range of 1.5 N/15 mm to 5.0 N/15 mm, e.g. approximately 2.5 N/15 mm. The application viscosity is generally ≤6500 mPa*s at 50° C., e.g. approximately ≤4000-5500 mPa*s.

EXAMPLES

The DER 736, from Dow Chemical, has the following properties: EEW is 182.9, (SEC Analysis Mn 500, Mw 600, Mz 800, Polydispersity 1.2, Wt Fraction ≤500 Dalton 44.6%, Wt. Fraction ≤1000 Daltons 92.0%.)

The DER 731, from Dow Chemical, has the following properties: EEW is 135, (SEC Analysis Mn 250, Mw 300, Mz 400, Polydispersity 1.2, Wt Fraction ≤500 Dalton 88.3%, Wt. Fraction ≤1000 Daltons 99.2%.)

Fascat™ 9100=hydroxybutyltin oxide, from Arkema, Inc., commercial grade

Unidyme™ 22=dimerized fatty acid, from Arizona Chemical, AV=192.9.

Polypox™ P370=polyaminoimidazoline hardener for epoxy resins, from The Dow Chemical Company; Amine Value of 485; Active Hydrogen Equivalent is 95.

Epikure™ 3140=polyamide curing agent, reaction product of dimerized fatty acid and polyamines, from Momentive; Amine Value of 375; Active Hydrogen Equivalent of 95.

Coex PP (75SLP)=Exxon Mobil Bicor SLP Oriented Polypropylene, Non-Heat Sealable, thickness 19 micrometers (0.75 mils)

Coex PP (70SPW)=Exxon Mobil Bicor SPW Coextruded Polypropylene, thickness 18 micrometers (0.70 mils)

PET=DuPont, Polyester, Poly(ethylene glycol-terephthalate), thickness 23 micrometer (92 Gauge) thick polyester film PE (GF-19)=Berry Plastics Corp., High slip low density polyethylene film, thickness 25.4 micrometers (1.0 mil).

Nylon=Honeywell Capran Emblem 1500, Biaxially Oriented Nylon 6 Film, thickness 15 micrometers.

PET-Met=FILMTech Inc., Metallized Polyester film, thickness 25.4 micrometers.

OPP-Met=AET Films, Metallized Oriented Polypropylene Film, MT Film, Heat Sealable, thickness 18 micrometers.

Backed Foil=12 micrometer (48 Gauge) Polyester (PET) Film laminated to 0.00035 mil Al Foil with Adcote 550/Coreactant F at 3.26 g/m² (2.00 lbs/ream).

PET (92LBT)=DuPont, Polyester, Poly(ethylene glycol-terephthalate), thickness 23 micron (92 Gauge).

SR238B and SR259 are diacrylate terminated resin available from Sartomer (Arkema Group); SR238B is 1,6-hexanediol diacrylate, SR259 is polyethylene glycol (200) diacrylate.

Example 1: Polyester Preparation

| Item | Monomer/Intermediate | Charge (g) |
|------|----------------------|------------|
| 1 | Trimethylolpropane | 39.99 |
| 2 | Diethylene Glycol | 1671.10 |
| 3 | Adipic Acid | 541.40 |
| 4 | Maleic Anhydride | 788.20 |
| 5 | Fascat 9100 (Hydroxybutyltin oxide) | 0.4041 |

Items 1-5 were charged to a reactor and were heated to 100° C. When the temperature reached 100° C., the temperature was increased to 175° C. and the resin was held at that temperature for 0.75 Hrs. The temperature was then increased to 200° C. and the resin was held at that temperature for 25 mins, after which the temperature was increased to 225° C. and the resin was held at that temperature for 1 Hr. The resin was then sampled for AV. When AV was ≤10, vacuum was applied and then decreased to about 260 mm. The resin was maintained at 225° C. and with a vacuum of 260 mm until AV was ≤3.0. The resin was then cooled to about 150° C., filtered, and packaged.

The final resin had the following properties: Acid Value (AV) 0.86, Hydroxyl Number (OHN) 172, Mn 1250, Mw 3450, Viscosity at 25° C. of 7406 mPa*s.

Example 2: Polyester Preparation

| Item | Ingredient | Charge (g) |
|------|------------|------------|
| 1 | Isophthalic Acid | 908.62 |
| 2 | Diethylene Glycol | 1126.80 |
| 3 | Fascat 9100 (Hydroxybutyltin oxide) | 0.5730 |
| 4 | Adipic Acid | 1198.87 |

Items 1-3 were charged to a vessel at Ambient Temperature (25-30° C.). The resin was heated to 100° C. under Nitrogen with stirring. Resin was then heated to 225° C. and was held at 225° C., when ca.50% of theoretical water was off. AV and In-Process Viscosity were monitored. The resin was maintained at 225° C. until AV<ca. 75. The resin was then cooled to <125° C. Item 4 was then added and the resin was maintained at 125-135° C. for 0.50 Hrs. The temperature was increased to 225° C. and was maintained at 225° C.; vacuum was applied at 327 mm as needed as to decrease AV to final target property. AV and Viscosity were monitored; the temperature was maintained at 225° C. until AV<ca. 150. The resin was then cooled to about 150° C., filtered and packaged.

The final resin had the following properties: Acid Value (AV) 149.73, Mn 950, Mw 1750, Mz 2550, Wt. Fraction ≤500 Daltons 10.6%, Wt. Fraction ≤1000 Daltons 32.1%, Viscosity at 25° C. of 29500 mPa*s.

Example 3: Polyester Preparation

| Item | Ingredient | Charge (g) |
|---|---|---|
| 1 | Isophthalic Acid | 942.70 |
| 2 | Diethylene Glycol | 654.60 |
| 3 | Ethylene Glycol | 362.20 |
| 4 | Fascat 9100 (Hydroxybutyltin oxide) | 0.3168 |
| 5 | Adipic Acid | 1239.19 |

Items 1-4 were charged to vessel at Ambient Temperature (25-30° C.). The resin was heated to 100° C. under Nitrogen with stirring. The resin was then heated to 225° C. and held at 225° C., when ca.50% of theoretical water was off. AV and In-Process Viscosity were monitored. The resin was maintained at 225° C. until AV<ca. 80. The resin was then cooled to <125° C. Item 5 was then added and the resin was maintained at 125-135° C. for 0.50 Hrs. The temperature was increased to 225° C. and was maintained at 225° C. Vacuum was applied at 327 mm as needed as to decrease AV to final target property. AV and Viscosity were monitored; the temperature was maintained at 225° C. until AV<ca. 105. The resin was then cooled to about 150° C., filtered and packaged.

The final resin had the following properties: Acid Value (AV) 98, Mn 1200, Mw 2450, Mz 3900, Wt. Fraction ≤500 Daltons 7.6%, Wt. Fraction ≤1000 Daltons 22.2%, Viscosity at 25° C. of 271,500 mPa*s.

Example 4: Polyester Preparation

| Item | Ingredient | Charge (g) |
|---|---|---|
| 1 | Isophthalic Acid | 1158.60 |
| 2 | Diethylene Glycol | 720.90 |
| 3 | Ethylene Glycol | 398.30 |
| 4 | Fascat 9100 (Hydroxybutyltin oxide) | 0.4089 |
| 5 | Adipic Acid | 1525.85 |

Items 1-4 were charged to vessel at Ambient Temperature (25-30° C.). The resin was heated to 100° C. under Nitrogen with stirring. The resin was then heated to 225° C. and held at 225° C., when ca.50% of theoretical water was off. The AV and In-Process Viscosity were monitored. The resin was maintained at 225° C. until AV<ca. 80. The resin was then cooled to <125° C. Item 5 was then added and the resin was maintained at 125-135° C. for 0.50 Hrs. The temperature was then increased to 225° C. and maintained at 225° C. Vacuum was applied at 435 mm as needed as to decrease AV to final target property. AV and Viscosity were monitored. The resin was maintained at 225° C. until AV<ca. 160. The resin was then cooled to about 150° C., filtered and packaged.

The final resin had the following properties: Acid Value (AV) 153, Mn 650, Mw 1550, Mz 2650, Wt. Fraction ≤500 Daltons 19.2%, Wt. Fraction ≤1000 Daltons 42.8%, Viscosity at 25° C. of 173,750 mPa*s.

Examples 5-11: Preparations of Epoxide Terminated Polyester Resins

The preparations in Examples 5-11 were similar. Diepoxide, one or more diacid, and catalyst were charged to the reactor. Slowly Heated to 135-140° C. Maintained at 135-140° C. for ca. 0.50 Hrs and then heated to 150-155° C. and maintained at 150-155° C. for ca. 1.25 to 2 Hrs and then monitored AV and Viscosity. Maintained at 150-155° C. and monitored AV and Visc until AV<1.0; transferred resin and package.

The formulations of Examples 5-9 are shown in Table 1, below.

TABLE 1

| | Examples 5-9 | | | | |
|---|---|---|---|---|---|
| | Example Number: | | | | |
| | 5 | 6 | 7 | 8 | 9 |
| Ingredient (g) | | | | | |
| DER 736 | 638.19 | 1950.37 | 1593.93 | 775.25 | 600.32 |
| Isophthalic Acid | 139.62 | 427.40 | 348.83 | | |
| Adipic Acid | | | | | |
| Polyester Resin of Ex. 2 | | | | 917.33 | |
| Polyester Resin of Ex. 3 | | | | | 1010.75 |
| EthylTriphenylphosphonium Iodide | 0.3726 | 1.5158 | 0.9532 | | |
| Sodium Acetate | | | | 0.5677 | 0.5156 |
| Properties | | | | | |
| EEW | 467.67 | 467.67 | 487.37 | 847.66 | 1244.17 |
| Acid Value | <0.05 | <0.05 | 0.1 | 0.04 | <0.1 |
| Mn | 1550 | 2450 | 1400 | 2150 | 3200 |
| Mw | 4650 | 6100 | 4400 | 13250 | 23450 |
| Mz | 10900 | 12600 | 10500 | 39550 | 82350 |

TABLE 1-continued

Examples 5-9

| | Example Number: | | | | |
|---|---|---|---|---|---|
| | 5 | 6 | 7 | 8 | 9 |
| Wt. Fraction ≤500 (%) | 8.6 | | 3.1 | 6.5 | 3.4 |
| Wt. Fraction ≤1000 (%) | 18.9 | 12.1 | 10.1 | 12.2 | 8.0 |
| Viscosity at 25° C. (mPa * s) | 18225 | 16075 | 18500 | 58125 | 272500 |
| Viscosity at 35° C. (mPa * s) | 6725 | 5725 | 6275 | 21750 | 91700 |

Formulations for Examples 10 and 11 are summarized in Table 2, below.

TABLE 2

Examples 10-11

| | Example Number: | |
|---|---|---|
| | 10 | 11 |
| Ingredient (g) | | |
| DER 731 | 540.02 | 292.73 |
| Polyester Resin of Ex. 3 | | 527.58 |
| Polyester Resin of Ex. 4 | 567.09 | |
| Sodium Acetate | 0.5068 | 0.5092 |
| Properties | | |
| EEW | 522.17 | 687.83 |
| Acid Value | <0.1 | <0.1 |
| Mn | 1750 | 1850 |
| Mw | 6600 | 12200 |
| Mz | 17150 | 42950 |
| Wt. Fraction ≤500 (%) | 6.7 | 6.2 |
| Wt. Fraction ≤1000 (%) | 15.7 | 12.4 |
| Viscosity at 25° C. (mPa * s) | 12575 | 41500 |
| Viscosity at 35° C. (mPa * s) | 5550 | 17025 |

Examples 12-24: Preparations of Epoxide Terminated Polyester Resin Blends

The preparations in Examples 12 through 24 are similar. Items in each of the formulas were charged to a reactor, slowly heated to 50° C., and mixed. The resin was maintained at 50° C. for 4 Hrs, after which it was transferred and packaged.

The formulations of Examples 12 through 16 are shown in Table 3, below.

TABLE 3

Example 12-16

| | Example Number: | | | | |
|---|---|---|---|---|---|
| | 12 | 13 | 14 | 15 | 16 |
| Ingredient (g) | | | | | |
| Epoxy Resin of Example 5 | 203.12 | | | | |
| Epoxy Resin of Example 6 | | 316.21 | 314.47 | 332.69 | 239.82 |
| Polyester Resin of Example 1 | 68.57 | | | | |
| SR238B | | | 35.14 | | 350.20 |
| SR259 | | | | 34.97 | 12.79 |
| Properties | | | | | |
| Viscosity at 25° C. (mPa * s) | 13525 | 4370 | 5600 | 8062 | 9200 |
| Viscosity at 35° C. (mPa * s) | 5300 | 1862 | 2262 | 3215 | 3560 |

The formulations of Examples 17 through 21 are shown in Table 4, below.

TABLE 4

Example 17-21

| | Example Number: | | | | |
|---|---|---|---|---|---|
| | 17 | 18 | 19 | 20 | 21 |
| Ingredient (g) | | | | | |
| Epoxy Resin of Example 7 | 250.10 | 250.60 | | | |
| Epoxy Resin of Example 8 | | | 269.97 | | |
| Epoxy Resin of Example 9 | | | | 201.45 | |
| Epoxy Resin of Example 10 | | | | | 252.61 |
| Polyester Resin of Example 1 | 13.34 | 28.15 | | | |
| SR238B | | | | | |
| SR259 | | | 14.33 | 10.69 | 13.37 |
| Properties | | | | | |
| Viscosity at 25° C. (mPa * s) | 16350 | 15050 | 34900 | 159000 | 8962 |
| Viscosity at 35° C. (mPa * s) | 5988 | 5600 | 13750 | 58375 | 3980 |

The formulations of Examples 22 and 24 are shown in Table 5, below.

TABLE 5

Example 22-24

| | Example Number: | | |
|---|---|---|---|
| | 22 | 23 | 24 |
| Ingredient (g) | | | |
| Epoxy Resin of Example 10 | | 253.79 | |
| Epoxy Resin of Example 11 | 252.49 | | 255.36 |
| SR238B | | 13.37 | 13.45 |
| SR259 | 13.32 | | |
| Properties | | | |
| Viscosity at 25° C. (mPa * s) | 22125 | 7488 | 18375 |
| Viscosity at 35° C. (mPa * s) | 9338 | 3425 | 7925 |

Example 25: Preparation of Amine Curative

| Item | Monomer/Intermediate | Charge |
|---|---|---|
| 1 | Unidyme 22 | 435.94 |
| 2 | Aminoethylpiperazine | 242.56 |

Items 1 and 2 were charged to a reactor and were slowly heated to 200° C. and maintained at that temperature for 2 Hrs while water evolution was monitored. The temperature was increased to 225-230° C. and was maintained for 1 Hr, after which the resin was transferred and packaged.

The final resin had the following properties: Amine Value 217.15, Viscosity at 25° C. of 51100 mP*s.

Example 26: Preparation of Amine Curative

| Item | Monomer/Intermediate | Charge |
|---|---|---|
| 1 | Amine Curative of Example 25 | 200.84 |
| 2 | POLYPOX P370 | 70.01 |

Items 1 and 2 were charged to a reactor. The resin was slowly heated to 50° C. and mixed. The temperature was maintained at 50° C. for 4 Hrs, after which the resin was transferred and packaged.

The final resin had the following properties: Amine Value 185.58, Viscosity at 25° C. of 10488 mPa*s.

Example 27: Preparation of Amine Curative

| Item | Monomer/Intermediate | Charge |
|---|---|---|
| 1 | Unidyme 22 | 877.12 |
| 2 | Aminoethylpiperazine | 488.24 |

Items 1 and 2 were charged to a reactor and were slowly heated to 200° C. and maintained at that temperature for 2 Hrs while water evolution was monitored. The temperature was increased to 225-230° C. and was maintained for 1 Hr, after which the resin was transferred and packaged.

The final resin had the following properties: Amine Value 238.90, Viscosity at 25° C. of 49000 mP*s.

Example 28: Preparation of Amine Curative

| Item | Monomer/Intermediate | Charge |
|---|---|---|
| 1 | Unidyme 22 | 810.77 |
| 2 | Triethylenetetramine | 448.71 |

Items 1 and 2 were charged to a reactor and were slowly heated to 200° C. and maintained at that temperature for 2 Hrs while water evolution was monitored. The temperature was increased to 225-230° C. and was maintained for 1 Hr, after which the resin was transferred and packaged.

The final resin had the following properties: Amine Value 169.64, Viscosity at 25° C. of 54625 mP*s.

Adhesive Evaluation Studies:

The adhesion properties of the epoxy-terminated polyester blends were evaluated with Amine based resins using a series of laminate constructions. These two part adhesive systems were evaluated via a solvent hand casting method and laminator.

The following abbreviations are used to describe test results: as: adhesive split; ftr: film tear; fstr: film stretch; fsl: film sliver; at: adhesive transfer; sec: secondary; zip: zippery bond; pmt: partial metal transfer. Adhesion bond strengths were determined on a 15 mm wide strip of laminate on a Thwing-Albert Tensile Tester (Model QC-3A) with a 50 Newton load cell at a 10.0 cm/min rate.

Examples 29-74 were performed as follows: An epoxy terminated polyester blend was mixed with a curing agent at the mix ratio shown below, in ethyl acetate at 50% concentration by weight. The solution was coated on a first substrate to yield a dry coating weight of 1.6276 g/m$^2$ (1.0 lb/ream). A second substrate was applied to the dried coating and the resulting laminate was cured at room temperature (approximately 25° C.). The bond strength was examined as a function of curing time and is reported below. The "Mix ratio" is the weight ratio of epoxy resin to curing agent, expressed as 100:X. In the column labeled "laminate structure," the first substrate is listed, followed by the second substrate.

Table 6 summarizes laminate Examples 29-31

TABLE 6

Laminate Examples 29-31

| Example Number | 29 | 30 | 31 |
|---|---|---|---|
| Epoxy Polyester Resin Blend from Ex. No. | 12 | 12 | 12 |
| Curing agent | Curing Agent of Ex. 25 | Curing Agent of Ex. 25 | Curing Agent of Ex. 26 |
| Mix Ratio | 100:48.6 | 100:36.5 | 100:41.6 |
| Application Viscosity @ 50° C. (mPa * s) | 8950 | 7950 | 5750 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 2.90, ftr | 1.45, ftr | 1.91, as | 1.31, ftr | 2.44, as | 2.62, ftr |
| CoexPP (75SLP)/PE (GF-19) | 4.09, as | 2.87, ftr | 2.70, as | 2.12, ftr | 2.86, as | 3.53, ftr |
| PET/PE (GF-19) | 2.62, as | 1.80, as | 2.32, as | 1.60, as | 2.45, as | 2.31, as |
| Nylon/PE (GF-19) | 2.90, as | 3.65, as | 2.23, as | 2.44, as | 3.07, as | 3.00, as |
| PET-Met/PE (GF-19) | 2.83, as | 2.74, as | 2.50, as | 2.19, as | 2.46, as | 1.75, as |
| OPP-Met/PE (GF-19) | 3.70, as | 3.68, as | 2.70, as | 2.64, as | 2.50, as | 1.85, ftr |
| OPP-Met/CoexPP (70SPW) | 2.75, as | 3.36, ftr | 2.66, as | 2.57, ftr | 2.40, as | 2.62, as |
| Backed Foil/Nylon | 0.24, as | 1.04, as | 0.20, as | 0.65, as | 1.41, as | 1.28, as |
| Backed Foil/PET (92LBT) | 0.29, as | 0.85, as | 0.20, as | 0.55, as | 0.82, as | 0.78, as |
| Backed Foil/PE (GF-19) | 2.44, as | 2.12, as | 2.01, as | 2.11, as | 1.81, as | 1.91, as |

Table 7 summarizes laminate Examples 32-34

TABLE 7

Laminate Examples 32-34

| Example Number | 32 | 33 | 34 |
|---|---|---|---|
| Epoxy Polyester Resin Blend from Ex. No. | 12 | 12 | 12 |
| Curing agent | Curing Agent of Ex. 26 | Epicure 3140 | Epicure 3140 |
| Mix Ratio | 100:31.2 | 100:21.3 | 100:16.0 |
| Application Viscosity @ 50° C. (mPa * s) | 5150 | 4925 | 4125 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 1.26, as | 1.87, ftr | 1.21, as | 1.61, ftr | 0.88, as | 1.43, ftr |
| CoexPP (75SLP)/PE (GF-19) | 2.18, as | 3.01, ftr | 1.36, as | 2.05, ftr | 1.00, as | 1.36, as |
| PET/PE (GF-19) | 2.03, as | 2.01, as | 1.63, as | 1.59, as | 1.20, as | 1.36, as |
| Nylon/PE (GF-19) | 2.13, as | 2.09, as | 1.38, as | 1.85, as | 1.12, as | 1.31, as |
| PET-Met/PE (GF-19) | 2.38, as | 1.84, as | 1.09, as | 1.11, as | 0.85, as | 0.88, as |
| OPP-Met/PE (GF-19) | 2.29, as | 1.30, as | 2.15, as | 2.28, as | 1.31, as | 1.45, as |
| OPP-Met/CoexPP (70SPW) | 2.21, as | 2.25, as | 1.23, as | 1.59, as | 1.10, as | 1.34, as |
| Backed Foil/Nylon | 1.15, as | 1.06, as | 0.39, as | 0.74, as | 0.19, as | 0.35, as |
| Backed Foil/PET (92LBT) | 0.74, as | 0.60, as | 0.43, as | 0.61, as | 0.17, as | 0.42, as |
| Backed Foil/PE (GF-19) | 1.18, as | 1.25, as | 1.23, as | 1.30, as | 0.98, as | 1.22, as |

Table 8 summarizes laminate Examples 35-37

TABLE 8

Laminate Examples 35-37

| Example Number | 35 | 36 | 37 |
|---|---|---|---|
| Epoxy Polyester Resin Blend from Ex. No. | 13 | 13 | 13 |
| Curing agent | Curing Agent of Ex. 27 | Curing Agent of Ex. 27 | Epicure 3140 |
| Mix Ratio | 100:67.0 | 100:50.3 | 100:26.9 |
| Application Viscosity @ 50° C. (mPa * s) | 5325 | 4050 | 2275 |

TABLE 8-continued

Laminate Examples 35-37

| Example Number | 35 | | 36 | | 37 | |
|---|---|---|---|---|---|---|
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 4.53, ftr | 3.06, ftr | 3.81, ftr | 2.56, ftr | 2.30, ftr | 2.38, ftr |
| CoexPP (75SLP)/PE (GF-19) | 5.30, ftr | 4.70, ftr | 3.53, ftr | 3.05, ftr | 3.60, ftr | 1.47, ftr |
| PET/PE (GF-19) | 2.94, as | 4.59, ftr | 2.43, as | 3.55, ftr | 1.78, as | 1.85, as |
| Nylon/PE (GF-19) | 6.18, ftr | 6.87, ftr | 4.25, ftr | 5.21, ftr | 3.26, ftr | 2.34, ftr |
| PET-Met/PE (GF-19) | 1.12, as | 0.74, as | 1.10, as | 0.66, as | 0.24, as | 0.25, as |
| OPP-Met/PE (GF-19) | 1.45, as | 0.81, as | 1.24, as | 0.67, as | 0.44, as | 0.51, as |
| OPP-Met/CoexPP (70SPW) | 1.50, as | 0.82, as | 1.44, as | 0.73, as | 0.56, as | 0.54, as |
| Backed Foil/Nylon | 0.74, as | 0.59, as | 0.59, as | 0.55, as | 0.16, as | 0.11, as |
| Backed Foil/PET (92LBT) | 0.75, as | 0.77, as | 0.75, as | 0.63, as | 0.19, as | 0.14, as |
| Backed Foil/PE (GF-19) | 1.63, as | 2.51, as | 1.43, as | 2.11, as | 0.98, as | 1.13, as |

Table 9 summarizes laminate Examples 38-40

TABLE 9

Laminate Examples 38-40

| Example Number | 38 | | 39 | | 40 | |
|---|---|---|---|---|---|---|
| Epoxy Polyester Resin Blend from Ex. No. | 13 | | 14 | | 14 | |
| Curing agent | Epicure 3140 | | Curing Agent of Ex. 27 | | Curing Agent of Ex. 27 | |
| Mix Ratio | 100:20.2 | | 100:61.7 | | 100:46.3 | |
| Application Viscosity @ 50° C. (mPa * s) | 2000 | | 6500 | | 5525 | |
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 1.93, ftr | 2.04, ftr | 3.78, ftr | 2.81, ftr | 3.01, ftr | 1.58, ftr |
| CoexPP (75SLP)/PE (GF-19) | 2.28, as | 2.11, as | 4.24, ftr | 3.10, ftr | 2.64, ftr | 1.79, ftr |
| PET/PE (GF-19) | 1.48, as | 1.62, as | 6.31, ftr | 3.21, ftr | 3.29, as | 2.415, as |
| Nylon/PE (GF-19) | 2.09, as | 2.04, as | 3.85, ftr | 3.59, ftr | 1.92, ftr | 1.84, ftr |
| PET-Met/PE (GF-19) | 0.12, as | 0.25, as | 1.04, as | 0.80, as | 1.06, as | 0.53, as |
| OPP-Met/PE (GF-19) | 0.26, as | 0.44, as | 0.82, as | 0.52, as | 0.54, as | 0.36, as |
| OPP-Met/CoexPP (70SPW) | 0.39, as | 0.48, as | 0.91, as | 0.64, as | 0.48, as | 0.38, as |
| Backed Foil/Nylon | 0.17, as | 0.00, as | 1.73, as | 1.15, as | 1.19, as | 0.99, as |
| Backed Foil/PET (92LBT) | 0.00, as | 0.00, as | 0.59, as | 0.37, as | 0.63, as | 0.21, as |
| Backed Foil/PE (GF-19) | 0.95, as | 0.95, as | 2.58, as | 2.18, as | 1.92, as | 1.35, as |

Table 10 summarizes laminate Examples 41-43

TABLE 10

Laminate Examples 41-43

| Example Number | 41 | | 42 | | 43 | |
|---|---|---|---|---|---|---|
| Epoxy Polyester Resin Blend from Ex. No. | 14 | | 14 | | 15 | |
| Curing agent | Epicure 3140 | | Epicure 3140 | | Curing Agent of Ex. 27 | |
| Mix Ratio | 100:24.6 | | 100:18.5 | | 100:56.4 | |
| Application Viscosity @ 50° C. (mPa * s) | 2800 | | 2275 | | 5650 | |
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 2.82, ftr | 2.17, ftr | 2.05, ftr | 1.59, ftr | 3.00, ftr | 2.93, ftr |
| CoexPP (75SLP)/PE (GF-19) | 2.54, ftr | 1.76, ftr | 0.64, as | 1.28, as | 4.90, ftr | 5.60, ftr |
| PET/PE (GF-19) | 1.62, as | 1.42, as | 1.63, as | 1.08, as | 3.97, fstr, as | 4.30, ftr |
| Nylon/PE (GF-19) | 2.50, ftr | 2.11, ftr | 0.35, as | 1.20, as | 3.76, as | 2.49, ftr |
| PET-Met/PE (GF-19) | 0.39, as | 0.25, as | 0.28, as | 0.22, as | 1.68, as | 0.91, as |

TABLE 10-continued

Laminate Examples 41-43

| Example Number | 41 | | 42 | | 43 | |
|---|---|---|---|---|---|---|
| OPP-Met/PE (GF-19) | 0.35, as | 0.30, as | 0.24, as | 0.17, as | 0.82, as | 1.12, as |
| OPP-Met/CoexPP (70SPW) | 0.44, as | 0.53, as | 0.29, as | 0.38, as | 1.59, ftr | 0.91, as |
| Backed Foil/Nylon | 0.15, as | 0.21, as | 0.08, as | 0.00, as | 0.00, as | 0.00, as |
| Backed Foil/PET (92LBT) | 0.20, as | 0.12, as | 0.16, as | 0.00, as | 0.00, as | 0.00, as |
| Backed Foil/PE (GF-19) | 1.07, as | 0.77, as | 0.97, as | 0.54, as | 1.72, as | 1.12, as |

Table 11 summarizes laminate Examples 44-46

TABLE 11

Laminate Examples 44-46

| Example Number | 44 | 45 | 46 |
|---|---|---|---|
| Epoxy Polyester Resin Blend from Ex. No. | 15 | 15 | 15 |
| Curing agent | Curing Agent of Ex. 27 | Epicure 3140 | Epicure 3140 |
| Mix Ratio | 100:42.3 | 100:23.5 | 100:17.6 |
| Application Viscosity @ 50° C. (mPa * s) | 4475 | 3025 | 2625 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 2.00, ftr | 1.99, ftr | 1.40, ftr | 2.11, ftr | 1.09, ftr | 1.57, ftr |
| CoexPP (75SLP)/PE (GF-19) | 2.98, ftr | 3.98, ftr | 3.10, ftr | 2.64, ftr | 1.89, ftr | 1.73, ftr |
| PET/PE (GF-19) | 2.25, as | 2.45, as | 1.73, as | 1.94, as | 1.24, as | 1.40, as |
| Nylon/PE (GF-19) | 2.21, ftr | 1.81, ftr | 3.76, ftr | 1.96, ftr | 2.21, as | 1.29, as |
| PET-Met/PE (GF-19) | 1.01, as | 0.77, as | 0.53, as | 0.29, as | 0.16, as | 0.11, as |
| OPP-Met/PE (GF-19) | 0.75, as | 0.92, as | 0.40, as | 0.62, as | 0.21, as | 0.39, as |
| OPP-Met/CoexPP (70SPW) | 0.62, as | 0.45, as | 0.49, as | 0.57, as | 0.35, as | 0.46, as |
| Backed Foil/Nylon | 0.00, as | 0.00, as | 0.60, as | 0.36, as | 0.25, as | 0.13, as |
| Backed Foil/PET (92LBT) | 0.00, as | 0.00, as | 0.12, as | 0.00, s | 0.00, as | 0.00, as |
| Backed Foil/PE (GF-19) | 0.93, as | 0.72, as | 0.87, as | 1.20, as | 0.51, as | 0.69, as |

Table 12 summarizes laminate Examples 47-49

TABLE 12

Laminate Examples 47-49

| Example Number | 47 | 48 | 49 |
|---|---|---|---|
| Epoxy Polyester Resin Blend from Ex. No. | 16 | 16 | 16 |
| Curing agent | Curing Agent of Ex. 27 | Curing Agent of Ex. 27 | Epicure 3140 |
| Mix Ratio | 100:56.4 | 100:42.3 | 100:22.5 |
| Application Viscosity @ 50° C. (mPa * s) | 5925 | 4125 | 3225 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 3.24, ftr | 3.01, ftr | 2.05, ftr | 1.84, ftr | 2.16, ftr | 1.79, ftr |
| CoexPP (75SLP)/PE (GF-19) | 4.32, ftr | 7.50, ftr | 2.64, ftr | 4.27, ftr | 2.17, ftr | 2.88, ftr |
| PET/PE (GF-19) | 2.38, as | 3.51, as | 1.48, as | 1.87, as | 1.85, as | 0.87, as |
| Nylon/PE (GF-19) | 3.92, ftr | 5.03, ftr | 2.31, ftr | 3.10, ftr | 2.04, as | 1.31, as |
| PET-Met/PE (GF-19) | 0.94, as | 0.63, as | 0.81, as | 0.51, as | 0.47, as | 0.31, as |
| OPP-Met/PE (GF-19) | 0.66, as | 0.89, as | 0.61, as | 0.85, as | 0.68, as | 0.39, as |
| OPP-Met/CoexPP (70SPW) | 0.88, as | 1.02, as | 0.71, as | 0.66, as | 0.67, as | 0.58, as |
| Backed Foil/Nylon | 0.24, as | 0.15, as | 0.12, as | 0.00, as | 0.09, as | 0.00, as |
| Backed Foil/PET (92LBT) | 0.30, as | 0.58, as | 0.12, as | 0.00, as | 0.17, as | 0.00, as |
| Backed Foil/PE (GF-19) | 2.06, as | 1.92, as | 0.09, as | 0.41, as | 0.93, as | 1.19, as |

Table 13 summarizes laminate Examples 50-52

TABLE 13

Laminate Examples 50-52

| Example Number | 50 | 51 | 52 |
|---|---|---|---|
| Epoxy Polyester Resin Blend from Ex. No. | 16 | 17 | 17 |
| Curing agent | Epicure 3140 | Epicure 3140 | Epicure 3140 |
| Mix Ratio | 100:16.9 | 100:20.5 | 100:15.4 |
| Application Viscosity @ 50° C. (mPa * s) | 2850 | 4125 | 3650 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 1.69, ftr | 1.35, ftr | 2.17, ftr | 2.66, ftr | 1.65, ftr | 1.98, ftr |
| CoexPP (75SLP)/PE (GF-19) | 1.65, ftr | 2.07, ftr | 2.25, as | 2.99, ftr | 1.77, as | 2.31, ftr |
| PET/PE (GF-19) | 1.28, as | 0.81, as | 1.91, as | 2.64, as | 1.39, as | 2.00, as |
| Nylon/PE (GF-19) | 1.27, as | 1.06, as | 1.01, as | 2.98, ftr | 0.57, as | 2.54, ftr |
| PET-Met/PE (GF-19) | 0.19, as | 0.10, as | 0.51, as | 0.65, as | 0.42, as | 0.70, as |
| OPP-Met/PE (GF-19) | 0.17, as | 0.10, as | 0.53, as | 0.69, as | 0.37, as | 0.42, as |
| OPP-Met/CoexPP (70SPW) | 0.27, as | 0.23, as | 0.50, as | 0.65, as | 0.33, as | 0.61, as |
| Backed Foil/Nylon | 0.00, as | 0.00, as | 0.89, as | 0.91, as | 0.78, as | 0.64, as |
| Backed Foil/PET (92LBT) | 0.00, as | 0.00, as | 0.61, as | 0.62, as | 0.39, as | 0.55, as |
| Backed Foil/PE (GF-19) | 0.36, as | 0.73, as | 1.67, as | 1.74, as | 1.19, as | 1.40, as |

Table 14 summarizes laminate Examples 53-55

TABLE 14

Laminate Examples 53-55

| Example Number | 53 | 54 | 55 |
|---|---|---|---|
| Epoxy Polyester Resin Blend from Ex. No. | 18 | 18 | 19 |
| Curing agent | Epicure 3140 | Epicure 3140 | Curing Agent of Ex. 27 |
| Mix Ratio | 100:20.4 | 100:15.3 | 100:29.3 |
| Application Viscosity @ 50° C. (mPa * s) | 4225 | 3700 | 13875 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 1.27, ftr | 1.58, ftr | 1.03, ftr | 1.25, ftr | 0.59, as | 0.98, as |
| CoexPP (75SLP)/PE (GF-19) | 2.91, ftr | 2.20, ftr | 1.13, as | 1.64, ftr | 0.68, as | 1.04, as |
| PET/PE (GF-19) | 1.31, as | 2.34, as | 1.12, as | 1.96, as | 0.58, as | 0.97, as |
| Nylon/PE (GF-19) | 2.19, as | 2.14, as | 1.59, as | 1.68, as | 0.71, as | 1.15, as |
| PET-Met/PE (GF-19) | 0.46, as | 0.39, as | 0.25, as | 0.27, as | 0.45, as | 0.62, as |
| OPP-Met/PE (GF-19) | 0.67, as | 0.63, as | 0.45, as | 0.31, as | 0.56, as | 0.67, as |
| OPP-Met/CoexPP (70SPW) | 0.91, as | 0.68, as | 0.80, as | 0.85, as | 0.81, as | 0.90, as |
| Backed Foil/Nylon | 0.71, as | 0.82, as | 0.47, as | 0.40, as | 0.70, as | 0.88, as |
| Backed Foil/PET (92LBT) | 0.46, as | 0.34, as | 0.40, as | 0.21, as | 0.68, as | 0.70, as |
| Backed Foil/PE (GF-19) | 1.45, as | 1.85, as | 1.20, as | 1.31, as | 0.92, as | 1.00, as |

Table 15 summarizes laminate Examples 56-58

TABLE 15

Laminate Examples 56-58

| Example Number | 56 | 57 | 58 |
|---|---|---|---|
| Epoxy Polyester Resin Blend from Ex. No. | 19 | 19 | 19 |
| Curing agent | Curing Agent of Ex. 27 | Curing Agent of Ex. 28 | Curing Agent of Ex. 28 |
| Mix Ratio | 100:22.0 | 100:20.9 | 100:15.7 |
| Application Viscosity @ 50° C. (mPa * s) | 11225 | 10675 | 8850 |

TABLE 15-continued

Laminate Examples 56-58

| Example Number | 56 | | 57 | | 58 | |
|---|---|---|---|---|---|---|
| | Bond Strength (N/15 mm) | | | | | |
| Laminate Structure | 7 Days | 14 Days | 7 Days | 14 Days | 7 Days | 14 Days |
| CoexPP (75SLP)/CoexPP (70SPW) | 0.33, as | 0.50, as | 1.13, fsl | 1.17, ftr | 1.39, fsl | 1.52, fsl |
| CoexPP (75SLP)/PE (GF-19) | 0.25, as | 0.52, as | 1.07, as | 1.42, as | 0.90, as | 1.12, as |
| PET/PE (GF-19) | 0.29, as | 0.49, as | 1.41, as | 1.61, as | 1.10, as | 1.38, as |
| Nylon/PE (GF-19) | 0.39, as | 0.69, as | 1.29, as | 1.84, as | 1.13, as | 1.23, as |
| PET-Met/PE (GF-19) | 0.43, as | 0.71, as | 0.31, as | 0.26, as | 0.40, as | 0.31, as |
| OPP-Met/PE (GF-19) | 0.56, as | 0.73, as | 0.51, as | 0.41, as | 0.55, as | 0.47, as |
| OPP-Met/CoexPP (70SPW) | 0.67, as | 0.89, as | 0.43, as | 0.46, as | 0.43, as | 0.38, as |
| Backed Foil/Nylon | 0.54, as | 0.93, as | 0.59, as | 0.54, as | 0.66, as | 0.50, as |
| Backed Foil/PET (92LBT) | 0.55, as | 0.82, as | 0.42, as | 0.40, as | 0.43, as | 0.37, as |
| Backed Foil/PE (GF-19) | 0.54, as | 0.82, as | 0.70, as | 0.76, as | 0.77, as | 0.74, as |

Table 16 summarizes laminate Examples 59-61

TABLE 16

Laminate Examples 59-61

| Example Number | 59 | 60 | 61 |
|---|---|---|---|
| Epoxy Polyester Resin Blend from Ex. No. | 21 | 21 | 21 |
| Curing agent | Curing Agent of Ex. 27 | Curing Agent of Ex. 27 | Curing Agent of Ex. 28 |
| Mix Ratio | 100:50.9 | 100:38.2 | 100:36.2 |
| Application Viscosity @ 50° C. (mPa * s) | 7275 | 6475 | 5825 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 1.85, as | 1.79, as | 1.35, as | 1.59, as | 1.58, as | 1.39, as |
| CoexPP (75SLP)/PE (GF-19) | 1.79, as | 1.93, as | 2.00, as | 2.72, as | 1.40, as | 1.13, as |
| PET/PE (GF-19) | 1.53, as | 2.12, as | 1.35, as | 1.46, as | 1.72, as | 1.44, as |
| Nylon/PE (GF-19) | 1.86, as | 2.36, as | 1.33, as | 1.90, as | 1.44, as | 0.89, as |
| PET-Met/PE (GF-19) | 0.72, as | 0.81, as | 0.96, as | 1.81, as | 0.55, as | 0.27, as |
| OPP-Met/PE (GF-19) | 0.78, as | 0.95, as | 0.95, as | 0.68, as | 0.53, as | 0.41, as |
| OPP-Met/CoexPP (70SPW) | 1.45, as | 0.84, as | 0.81, as | 0.72, as | 0.86, as | 0.40, as |
| Backed Foil/Nylon | 1.26, as | 1.50, as | 1.40, as | 1.80, as | 0.90, as | 0.54, as |
| Backed Foil/PET (92LBT) | 1.28, as | 1.16, as | 1.06, as | 1.17, as | 0.48, as | 0.38, as |
| Backed Foil/PE (GF-19) | 1.10, as | 1.56, as | 1.37, as | 1.67, as | 1.10, as | 0.69, as |

Table 17 summarizes laminate Examples 62-64

TABLE 17

Laminate Examples 62-64

| Example Number | 62 | 63 | 64 |
|---|---|---|---|
| Epoxy Polyester Resin Blend from Ex. No. | 21 | 22 | 22 |
| Curing agent | Curing Agent of Ex. 28 | Curing Agent of Ex. 27 | Curing Agent of Ex. 27 |
| Mix Ratio | 100:27.2 | 100:40.9 | 100:30.6 |
| Application Viscosity @ 50° C. (mPa * s) | 5075 | 11975 | |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 1.61, as | 1.44, as | 2.00, as | 1.62, as | 1.36, as | 1.58, as |
| CoexPP (75SLP)/PE (GF-19) | 2.36, ftr | 2.59, ftr | 2.37, as | 3.62, as | 2.12, as | 1.85, as |
| PET/PE (GF-19) | 3.03, as | 2.67, as | 1.92, as | 3.10, as | 2.03, as | 2.10, as |
| Nylon/PE (GF-19) | 0.92, as | 3.29, ftr | 1.89, as | 1.86, as | 2.04, as | 1.23, as |
| PET-Met/PE (GF-19) | 0.47, as | 1.37, as | 1.56, as | 1.41, as | 1.34, as | 1.35, as |

TABLE 17-continued

| Laminate Examples 62-64 | | | | | | |
|---|---|---|---|---|---|---|
| Example Number | 62 | | 63 | | 64 | |
| OPP-Met/PE (GF-19) | 0.55, as | 1.50, as | 1.31, as | 1.56, as | 1.51, as | 1.49, as |
| OPP-Met/CoexPP (70SPW) | 0.40, as | 1.45, as | 1.26, as | 1.45, as | 1.58, as | 1.23, as |
| Backed Foil/Nylon | 1.04, as | 0.72, as | 1.67, as | 2.04, as | 2.25, as | 1.71, as |
| Backed Foil/PET (92LBT) | 0.66, as | 1.54, as | 1.80, as | 1.90, as | 1.52, as | 1.84, as |
| Backed Foil/PE (GF-19) | 1.58, as | 0.71, as | 1.94, as | 1.97, as | 2.11, as | 1.44, as |

Table 18 summarizes laminate Examples 65-67

TABLE 18

| Laminate Examples 65-67 | | | |
|---|---|---|---|
| Example Number | 65 | 66 | 67 |
| Epoxy Polyester Resin Blend from Ex. No. | 22 | 22 | 23 |
| Curing agent | Curing Agent of Ex. 28 | Curing Agent of Ex. 28 | Curing Agent of Ex. 27 |
| Mix Ratio | 100:29.1 | 100:21.8 | 100:53.5 |
| Application Viscosity @ 50° C. (mPa * s) | | | 6325 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 1.54, as | 2.73, ftr | 1.08, as | 2.07, ftr | 0.83, as | 0.80, as |
| CoexPP (75SLP)/PE (GF-19) | 1.00, as | 3.27, ftr | 2.28, as | 3.04, ftr | 0.79, as | 0.95, as |
| PET/PE (GF-19) | 1.47, as | 2.98, as | 4.31, as | 2.45, as | 0.96, as | 1.41, as |
| Nylon/PE (GF-19) | 1.60, as | 2.58, ftr | 1.63, as | 1.49, as | 0.79, as | 1.33, as |
| PET-Met/PE (GF-19) | 0.40, as | 0.57, as | 0.43, as | 0.48, as | 0.76, as | 0.91, as |
| OPP-Met/PE (GF-19) | 0.37, as | 0.76, as | 0.61, as | 0.67, as | 0.76, as | 0.91, as |
| OPP-Met/CoexPP (70SPW) | 0.46, as | 0.70, as | 1.56, as | 1.22, as | 0.81, as | 1.06, as |
| Backed Foil/Nylon | 0.57, as | 0.93, as | 0.79, as | 0.79, as | 1.28, as | 1.24, as |
| Backed Foil/PET (92LBT) | 0.36, as | 0.69, as | 0.63, as | 1.62, as | 1.45, as | 1.30, as |
| Backed Foil/PE (GF-19) | 0.76, as | 1.32, as | 1.31, as | 1.39, as | 1.24, as | 1.19, as |

Table 19 summarizes laminate Examples 69-70

TABLE 19

| Laminate Examples 68-70 | | | |
|---|---|---|---|
| Example Number | 68 | 69 | 70 |
| Epoxy Polyester Resin Blend from Ex. No. | 23 | 23 | 23 |
| Curing agent | Curing Agent of Ex. 27 | Curing Agent of Ex. 28 | Curing Agent of Ex. 28 |
| Mix Ratio | 100:40.1 | 100:38.1 | 100:28.6 |
| Application Viscosity @ 50° C. (mPa * s) | 5875 | 5050 | 4150 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 0.32, as | 0.93, as | 2.04, as | 1.56, as | 1.30, as | 2.72, ftr |
| CoexPP (75SLP)/PE (GF-19) | 0.22, as | 0.86, as | 4.25, ftr | 4.41, ftr | 1.85, as | 2.55, ftr |
| PET/PE (GF-19) | 0.38, as | 0.79, as | 3.09, as | 3.40, as | 2.36, as | 2.06, as |
| Nylon/PE (GF-19) | 0.27, as | 0.76, as | 2.76, ftr | 3.02, ftr | 2.05, as | 2.59, ftr |
| PET-Met/PE (GF-19) | 0.29, as | 0.54, as | 0.49, as | 0.97, as | 0.84, as | 0.65, as |
| OPP-Met/PE (GF-19) | 0.37, as | 0.57, as | 0.66, as | 0.64, as | 0.87, as | 0.87, as |
| OPP-Met/CoexPP (70SPW) | 0.42, as | 0.95, as | 0.75, as | 0.55, as | 0.77, as | 0.74, as |
| Backed Foil/Nylon | 0.69, as | 1.21, as | 0.80, as | 0.79, as | 1.09, as | 0.79, as |
| Backed Foil/PET (92LBT) | 0.42, as | 0.69, as | 0.81, as | 0.60, as | 0.94, as | 0.57, as |
| Backed Foil/PE (GF-19) | 0.61, as | 1.34, as | 1.43, as | 1.16, as | 1.39, as | 1.07, as |

Table 20 summarizes laminate Examples 71-73

TABLE 20

Laminate Examples 71-73

| Example Number | 71 | 72 | 73 |
|---|---|---|---|
| Epoxy Polyester Resin Blend from Ex. No. | 24 | 24 | 24 |
| Curing agent | Curing Agent of Ex. 27 | Curing Agent of Ex. 27 | Curing Agent of Ex. 28 |
| Mix Ratio | 100:43.5 | 100:32.6 | 100:30.9 |
| Application Viscosity @ 50° C. (mPa * s) | 11650 | 8875 | 10200 |

| | Bond Strength (N/15 mm) | | | | | |
|---|---|---|---|---|---|---|
| Laminate Structure | 7 Days | 14 Days | 7 Days | 14 Days | 7 Days | 14 Days |
| CoexPP (75SLP)/CoexPP (70SPW) | 1.01, as | 1.62, as | 0.88, as | 1.11, as | 2.07, ftr | 2.30, ftr |
| CoexPP (75SLP)/PE (GF-19) | 1.39, as | 2.07, as | 0.91, as | 1.60, as | 2.84, ftr | 2.60, ftr |
| PET/PE (GF-19) | 1.27, as | 3.38, as | 1.15, as | 1.30, as | 2.17, as | 2.26, as |
| Nylon/PE (GF-19) | 1.02, as | 1.35, as | 0.64, as | 0.72, as | 2.23, ftr | 2.51, ftr |
| PET-Met/PE (GF-19) | 0.97, as | 1.34, as | 0.98, as | 1.66, as | 0.64, as | 0.71, as |
| OPP-Met/PE (GF-19) | 1.43, as | 1.26, as | 1.36, as | 1.66, as | 0.82, as | 0.59, as |
| OPP-Met/CoexPP (70SPW) | 1.58, as | 1.52, as | 1.14, as | 1.20, as | 0.82, as | 0.67, as |
| Backed Foil/Nylon | 1.68, as | 1.76, as | 1.82, as | 2.03, as | 1.01, as | 0.84, as |
| Backed Foil/PET (92LBT) | 1.10, as | 1.56, as | 1.13, as | 1.49, as | 0.80, as | 0.80, as |
| Backed Foil/PE (GF-19) | 2.00, as | 2.07, as | 1.69, as | 2.05, as | 1.16, as | 1.27, as |

Table 21 summarizes laminate Example 74

TABLE 21

Laminate Example 74

| Example Number | 74 |
|---|---|
| Epoxy Polyester Resin Blend from Ex. No. | 24 |
| Curing agent | Curing Agent of Ex. 27 |
| Mix Ratio | 100:23.2 |
| Application Viscosity @ 50° C. (mPa * s) | 9875 |

| | Bond Strength (N/15 mm) | |
|---|---|---|
| Laminate Structure | 7 Days | 14 Days |
| CoexPP (75SLP)/CoexPP (70SPW) | 1.84, ftr | 2.39, ftr |
| CoexPP (75SLP)/PE (GF-19) | 1.77, ftr | 1.83, ftr |
| PET/PE (GF-19) | 1.97, as | 2.46, as |
| Nylon/PE (GF-19) | 2.03, ftr | 3.35, ftr |
| PET-Met/PE (GF-19) | 0.62, as | 0.75, as |
| OPP-Met/PE (GF-19) | 0.67, as | 0.77, as |
| OPP-Met/CoexPP (70SPW) | 0.58, as | 0.68, as |
| Backed Foil/Nylon | 0.76, as | 1.15, as |
| Backed Foil/PET (92LBT) | 0.60, as | 0.77, as |
| Backed Foil/PE (GF-19) | 0.96, as | 1.36, as |

Test Methods

Viscosity for 100% solid resins is measured by employing a Brookfield RV DV-II+ Viscometer with a thermostated small sample adapter with a spindle #27 and varying the temperature over a range of 25 to 70° C. in increments of 5° C. and allowing the sample to stabilize at temperature for 20 to 30 mins prior to recording viscosity. Viscosity is reported in milliPascal*seconds (mP*s), which is equal to centipoise.

Pot-life and application viscosity of the adhesive system was determined employing a Brookfield RV DV-II+ Viscometer with a thermostated small sample adapter with a spindle #27 with the thermostated cell at a temperature of 50° C. The viscosity is monitored as a function of time, viscosity is reported in milliPascal*seconds (mPa*s); application viscosity is the minimum viscosity measured at 50° C.

Acid Value (AV) is measured by the method of ASTM D3655-06 (American Society for Testing and Materials, West Conshohocken, Pa., USA).

Hydroxyl Number (OHN) is measured by the method of ASTM E1899-08 (American Society for Testing and Materials, West Conshohocken, Pa., USA).

Amine Value is measured by the method of ASTM D2074-07 for Test Method for Total, Primary, Secondary, and Tertiary Amine Values of Fatty Amines by Alternative Indicator Method (American Society for Testing and Materials, West Conshohocken, Pa., USA).

Epoxy Equivalent Weight (EEW) is measured by the method of ASTM D1652-11 (American Society for Testing and Materials, West Conshohocken, Pa., USA).

Adhesion bond strengths were determined on a 15 mm wide strip of laminate on a Thwing-Albert Tensile Tester (Model QC-3A) with a 50 Newton load cell at a 10.0 cm/min rate. The average bond strength of three separate laminates is reported.

Size Exclusion Chromatography (SEC) used two PLgel Mix-B and PLgel Mixed-D columns and Viscotek's triple detector. Polystyrene standards were used to establish a universal calibration curve that determines the weight-averaged and number-averaged molecular weights. The sample was diluted with THF to a polymer concentration of approximately 2.5 mg/ml prior to analysis.

We claim:

1. A curable formulation comprising
   a) a blend comprising
      i) an epoxy terminated polyester having the structure

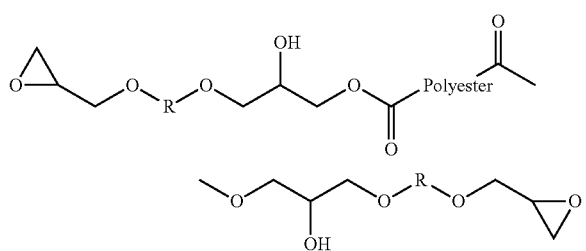

wherein R— is selected from the group consisting of

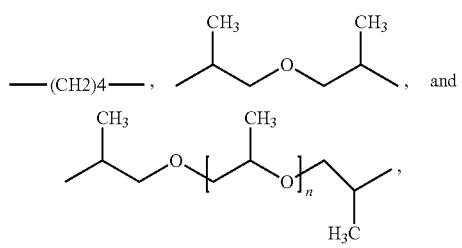

wherein n is 1-25 and wherein the polyester unit is derived from a polyester selected from the group consisting of a carboxylic acid-terminated polyester and a dicarboxylic acid-terminated polyester; and ii) a maleate (poly) ester having a structure selected from the group consisting of

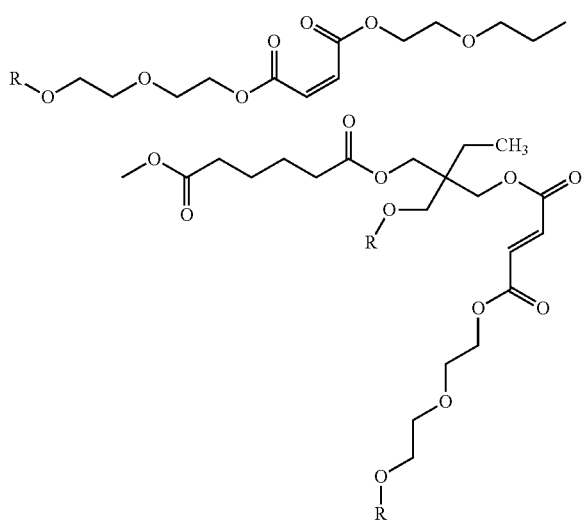

wherein R is independently hydrogen or

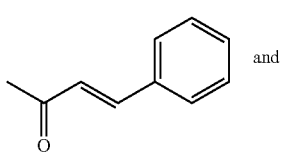

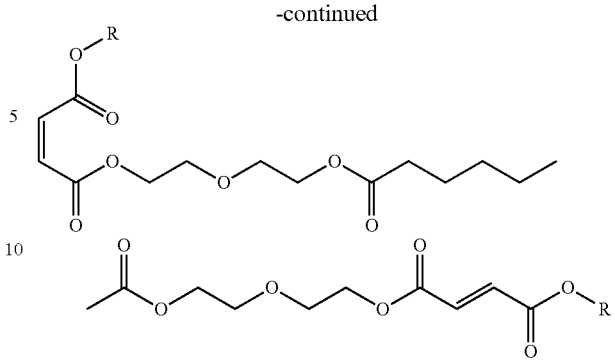

wherein R is independently $CH_3$, $C_2H_5$, or

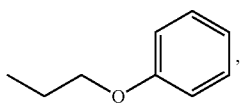

and b) an aliphatic amine curing agent, wherein the formulation is bisphenol-A free.

2. The formulation of claim 1, wherein the polyester unit is derived from a polyester selected from the group consisting of an adipic acid-terminated polyester, an azelaic acid-terminated polyester, a sebacic acid-terminated polyester, a succinic acid-terminated polyester, a fumaric acid-terminated polyester, a maleic acid-terminated polyester, a 1,4-cyclohexanedicarboxylic acid-terminated polyester, an orthophthalic acid-terminated polyester, an isophthalic acid-terminated polyester, a terephthalic acid-terminated polyester, an ethylene glycol-terminated polyester, a diethylene glycol-terminated polyester, a propylene glycol-terminated polyester, a dipropylene glycol-terminated polyester, a 1,4-butanediol-terminated polyester, a 2-methyl-1,3-propanediol-terminated polyester, a neopentyl glycol-terminated polyester, a 1,6-hexanediol-terminated polyester, a 1,4-cyclohexanedimethanol-terminated polyester, a 1,3-cyclohexanedimethanol-terminated polyester, a triethylene glycol-terminated polyester, a trimethylol ethane-terminated polyester, a trimethylol propane-terminated polyester, a glycerine-terminated polyester, a phthalic anhydride-terminated polyester, and a maleic anhydride-terminated polyester.

3. The formulation of claim 1, wherein the epoxy-terminated polyester resin has an epoxy equivalent weight in the range of from 242 to 1200.

4. The formulation of claim 1, wherein the polyester unit is derived from a carboxylic acid-terminated polyester having an acid value in the range of from 100 to 250.

5. The formulation of claim 1, wherein the maleate (poly)ester is a maleic anhydride copolymerized with a dicarboxylic acid and/or an anhydride and a glycol.

6. The formulation of claim 5 wherein the dicarboxylic acid is selected from the group consisting of adipic acid, azelaic acid, sebacic acid, succinic acid, fumaric acid, maleic acid, 1,4-cyclohexanedicarboxylic acid, and orthophthalic acid and the glycol is selected from the group consisting of ethylene glycol, diethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, triethylene glycol, isosorbide, trimethylol ethane, trimethylol propane, and glycerine.

7. The formulation of claim 1 wherein the aliphatic amine is a derivative of a compound selected from the group consisting of ethylenediamine, diethylenetriamine, triethylenetetramine, tetraethylenepentamine, piperazine, aminoethylpiperazine, isophorone diamine, xylylenediamine, and combinations thereof.

8. The formulation of claim 1 wherein the aliphatic amine has a molecular weight of at least 750 amu.

9. The formulation of claim 1 wherein the blend a) and the aliphatic amine b) are present in a mix ratio in the range of from 100:15.0 to 100:70.0.

10. The formulation of claim 1, further comprising a solvent.

11. The formulation of claim 10 wherein the solvent is selected from the group consisting of ethyl acetate, methyl ethyl ketone, methyl acetate, acetone, and combinations thereof.

12. The formulation of claim 1 wherein the formulation is substantially solvent-free.

13. A laminating adhesive prepared from the formulation of claim 1.

14. The laminating adhesive of claim 13, wherein the laminating adhesive has an adhesive bond strength in the range of 1.5 to 5.0 N/15 mm and an application viscosity of ≤6500 mPa*s at 50° C.

* * * * *